United States Patent [19]

Au

[11] 3,835,302

[45] Sept. 10, 1974

[54] RING-COUNTER

[75] Inventor: Kenneth K. Au, Ottawa, Ontario, Canada

[73] Assignee: Microsystems International Limited, West Montreal, Quebec, Canada

[22] Filed: Feb. 15, 1973

[21] Appl. No.: 332,542

[30] Foreign Application Priority Data

Dec. 29, 1972 Canada ................................ 160227

[52] U.S. Cl........ 235/92 NG, 235/92 LG, 236/92 R, 328/43, 307/223

[51] Int. Cl. .............................................. H03k 27/00

[58] Field of Search .... 235/92 NG, 92 LG, 92 SH; 328/43; 307/223

[56] References Cited

UNITED STATES PATENTS 3,349,332 10/1967 Bleichardt...................... 235/92 NG 3,513,329 5/1970 Washizurka et al. ............... 307/223

*Primary Examiner*—Gareth D. Shaw

*Assistant Examiner*—Joseph M. Thesz, Jr.

*Attorney, Agent, or Firm*—S. T. Jelly

[57] ABSTRACT

A ring counter having a number of series connected elements, each element having a feedback path to the preceding element and a feed-forward path to the succeeding element. For error-free operation, regardless of noise occurring at any input within the counter, each element requires ($n$-2) feedback paths associated therewith, "$n$" being the number of elements within the counter.

28 Claims, 10 Drawing Figures

RING-COUNTER

The present invention relates to ring-counters.

A ring counter generally comprises a number of series connected elements in a ring, each element having data storage and transfer capabilities such that when a clock signal is applied to the elements, data is shifted from one element to the next around the ring. Conventionally, one type of ring-counter element comprises a J-K flip-flop, the output nodes of which are connected to the inputs of the succeeding element. This type of counter has serious disadvantages in that noise upon a line carrying ZERO or ONE information throughout this specification, (ZERO is a disabling potential for devices in the elements) may give an erroneous input of the complementary binary level.

The present invention meets this problem by providing feed-back as well as feed-forward inputs. Thus, the output from one element is fed to the first input of the succeeding element (this constitutes the feed-forward path) and also to the second input of the preceding element (the feedback path). Each element therefore has a first input derived from the output of the preceding stage and a second input derived from the output of the succeeding state. In a block of three elements, it is clear that the output from each element will affect the inputs of the other two by means of the feedback and feed-forward paths established. In fact, because of this interconnection scheme, the probability of noise on these paths causing an invalid condition within the counter is greatly reduced, as will hereinafter be explained.

Thus, according to the present invention, a ring-counter comprises a plurality of serially connected elements, each element having first and second data input terminals and a data output terminal, said data output terminal of each element connected to one data input terminal of the succeeding element to form a feed-forward path and said output terminal of each element further connected to one data input terminal of the preceding element to form a feedback path.

According to one embodiment of the invention said ring-counter contains ($n$) said elements and ($n$-2) feed-back paths — "$n$" being an integer - each one of said elements having a feed-back path extending from its data output terminal to a data input terminal upon each of ($n$-2) consecutive elements immediately preceding said one element.

According to further embodiments of the invention there are provided circuits for use in the ring counter of the invention.

The invention will now be described further by way of example only and with reference to the accompanying drawings, wherein.

Figure 1:
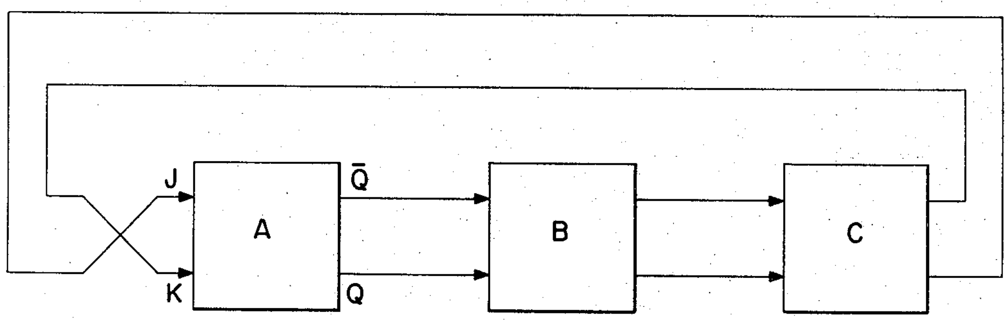
Fig. 1 (PRIOR ART)
FIG. 1 is a block-diagram of a ring-counter according to the prior art.

Referring now to the drawings, and in particular to FIG. 1 thereof, a ring-counter according to the prior art comprises serially connected elements A, B and C, each element comprising a J-K flip-flop having outputs Q and Q, and inputs J and K. The Q output from each element is connected to the J input of the succeeding element and the Q output from each element is connected to the K input of the succeeding element, except for the pair of elements C and A, wherein the Q output of C is connected to the K input of A and the Q output of C is connected to the J input of A. Now, it will be appreciated that, since each of the elements essentially comprises a conventional J-K flip-flop, noise on any of the lines which tends to place the potential on that line at the complementary binary logic level to that at which the line should be, may cause the flip-flop associated with that line to give an invalid output. In other words, the counter may give more than one ONE level state, so that, for example, at any given time, instead of the state of the counter being 1,0,0, the state may be 1,1,0 — which is invalid.

Figure 2:
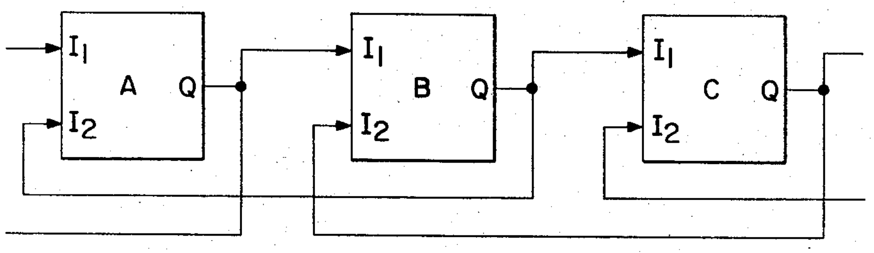
FIG. 2 is a block-diagram of part of a ring-counter according to the present invention.

Consider now FIG. 2, which show elements A, B and C of a ring-counter according to the present invention. Now, it will be seen that each element only has one output Q and two inputs $I_1$ and $I_2$. The output Q of element B is connected to the input of $I_1$ of element C and the input $I_2$ of element A. The output Q of element C is connected to the output $I_2$ of element B and to the input $I_1$ of the succeeding stage (not shown). The output Q of element A is connected to the input $I_1$ of element B and to the input $I_2$ of the preceding stage (not shown). Thus the paths Q–$I_1$ may be called the feed-forward paths of the counter and the paths Q–$I_2$, the feedback paths. Now any noise on, say, the output Q of element B will occur on the input $I_1$ to element C and the input $I_2$ to element A. Thus, supposing at the time this noise occurs, the state of the counter is 1, 0, 0 (output Q from A = 1 and outputs Q from B and C = 0), then, if the noise on output Q of element B is such that element A will revert to a ZERO output as a result of such noise, then element C will also change state and go to a ONE output. Therefore, the condition of the counter becomes 0, 0, 1, which means that a valid condition still exists — i.e. only one ONE state — but the transmission from the condition 1, 0, 0 to 0, 0, 1 has been accomplished without passing through the condition 0, 1, 0. In other words, the shift of the ONE level around the counter has by-passed element B but, most importantly, the condition of the counter is valid. Now, with only one feed-back path per element, this unconditional validity only applies within blocks of three elements. To extend the operation so that invalidity cannot exist within blocks of more than three elements, more feed-back paths per cell are required as will hereinafter be described.

Figure 3:
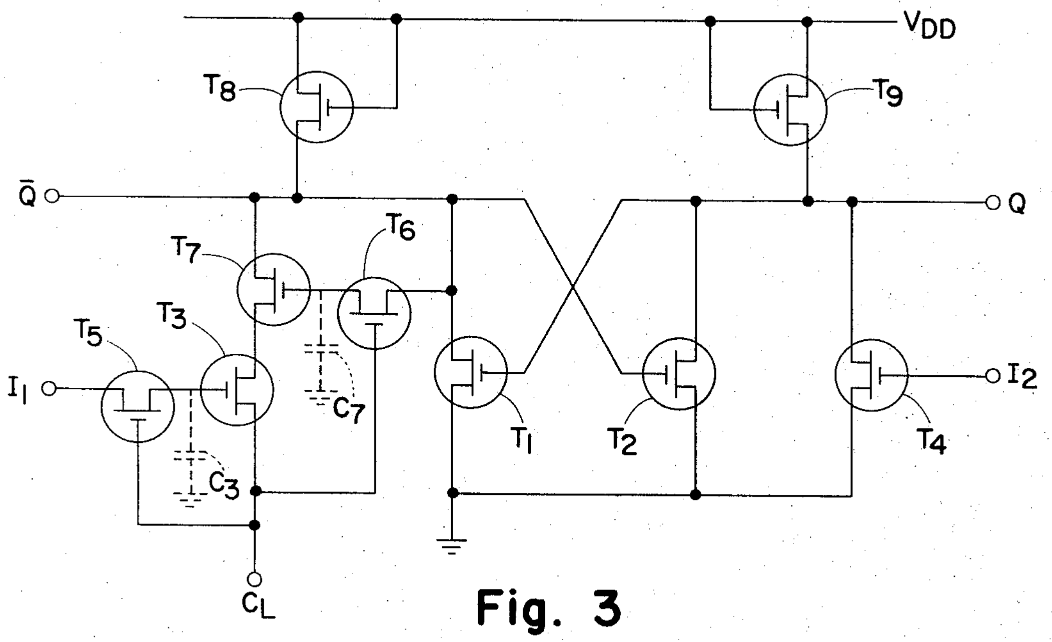
FIG. 3 is a circuit diagram of a ring-counter element for use in a ring-counter according to one embodiment of the invention.

In FIG. 3, one circuit realization of an element for use in the ring-counter of the invention is shown. The circuit comprises field-effect transistors $T_1$ to $T_9$ inclusive. The input $I_1$ is connected through transistor $T_5$ to the gate electrode of transistor $T_3$. The gate electrode of $T_5$ and source electrode of $T_3$ are interconnected and connected to clock-signal supply $C_L$. The drain electrode of $T_3$ is connected to the source electrode of $T_7$, the drain electrode of which is connected through load transistor $T_8$ to a potential supply rail $V_{DD}$. The gate electrode of $T_7$ is connected to the source electrode of transistor $T_6$, the drain electrode of which is connected to the drain electrode of $T_7$. The gate electrode of $T_6$ is connected to $C_L$. Also connected to the drain electrode of $T_7$ is the drain electrode of transistor $T_1$, the source electrode of which is connected to reference ground potential. Transistor $T_1$ is cross-coupled with transistor $T_2$, the gate electrode of $T_1$ being connected to the drain electrode of $T_2$ and the drain electrode of $T_1$ being connected to the gate electrode of $T_2$. The source electrode of $T_2$ is connected to reference ground potential and the drain electrode of $T_2$ is connected to the $V_{DD}$ rail through load transistor $T_9$. The drain electrode of transistor $T_4$ is connected to the drain electrode of $T_2$ and the source electrode of $T_4$ is connected to reference ground potential. The gate electrode of $T_4$ is connected to input $I_2$. Output nodes Q and Q are at the drain electrodes of $T_1$ and $T_2$. The operation of the circuit of FIG. 3 will hereinafter be described with reference to a complete ring-counter.

Figure 4:
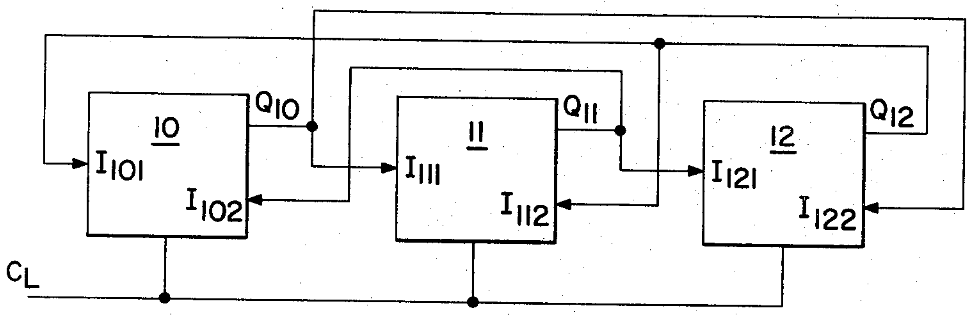
FIG. 4 is a block-diagram of a three-element ring-counter utilizing the elements of FIG. 3.

A ring-counter containing three of the elements of FIG. 3 is shown in block form in FIG. 4. The circuit comprises elements 10, 11 and 12 having signal inputs $I_{101}$, $I_{102}$; $I_{111}$, $I_{112}$; and $I_{121}$, $I_{122}$; respectively and outputs $Q_{10}$, $Q_{11}$ and $Q_{12}$, respectively. Inputs $I_{101}$, $I_{111}$ and $I_{121}$ correspond to input $I_1$ of FIG. 3; inputs $I_{102}$, $I_{112}$ and $I_{122}$ correspond to input $I_2$ and outputs $Q_{10}$, $Q_{11}$ and $Q_{12}$ correspond to output Q. Remembering that elements 10, 11 and 12 form a ring, $I_{101}$ is connected to $Q_{12}$ and $I_{102}$ is connected to $Q_{11}$. For element 11, $I_{111}$ is connected to $Q_{10}$ and $I_{112}$ is connected to $Q_{12}$. For element 12, $I_{121}$ is connected to $Q_{11}$ and $I_{122}$ is connected to $Q_{10}$. Thus inputs $I_{101}$, $I_{111}$ and $I_{121}$ may be called the "feed-forward" inputs of the counter and the inputs $I_{102}$, $I_{112}$ and $I_{122}$ may be called the "feed-back" inputs.

Each element is connected to the clock signal rail $C_L$ in the manner of FIG. 3.

Consider now data flow through the counter. The logic-level convention used in the following description is that logic-level ONE is an "enabling potential for the transistors of the ring-counter elements and logic-level ZERO is a "disabling potential. Let it be assumed that at the beginning of a cycle of operation — say at time $t_o$ — output $Q_{10}$ of element 10 is at ONE, $Q_{11}$ is at ZERO and $Q_{12}$ is at ZERO. At this time, $C_L$ is at level ONE. In tabular form this is shown thusly:

| $C_L$ | $I_{101}$ $(=Q_{12})$ | $I_{102}$ $(=Q_{11})$ | $Q_{10}$ | $I_{111}$ $(=Q_{10})$ | $I_{112}$ $(=Q_{12})$ | $Q_{11}$ | $I_{121}$ $(=Q_{11})$ | $I_{122}$ $(=Q_{10})$ | $Q_{12}$ |
|---|---|---|---|---|---|---|---|---|---|
| 1 | 0 | 0 | 1 | 1 | 0 | 0 | 0 | 1 | 0 |

The state of each element at time $t_o$ will now be examined. Element 10 has Q=1, therefore $T_1$ is enabled. $T_6$ is also enabled, since $C_L$=1, and any charge on $C_7$ (the gate to substrate capacitance of $T_7$) is therefore discharged to reference ground potential through $T_1$ and $T_6$. Input $I_{101}$ = 0 and $T_5$ is enabled due to $C_L$ being ONE. Therefore, any charge on $C_3$ (the gate-to-substrate capacitance of $T_3$) is discharged through $T_5$.

Considering element 11, $Q_{11}$=0. Input $I_{111}$=1 and $T_5$ is enabled due to $C_L$ being ONE. Therefore charge is transferred to the gate of transistor $T_3$ and stored in capacitor $C_3$. Since $Q_{11}$=0, $T_1$ is disabled. $T_6$ is enabled due to $C_L$ and the gate of $T_7$ is therefore connected through $T_6$ to Q which is at level ONE. Therefore, charge is transferred to the gate of $T_7$ and stored in capacitor $C_7$.

Considering element 12, $Q_{12}$=0. Input $I_{121}$=0 and $T_5$ is enabled. Therefore, any charge on $C_3$ is drained through $T_5$. Since $Q_{12}$=0, $T_1$ is disabled, and $T_6$ is enabled due to $C_L$. Therefore, charge is transferred to the gate of $T_7$ and stored on capacitor $C_7$.

At time $t_1$, $C_L$ swings to logic-level ZERO. Now, for element 10, $T_6$ and $T_5$ are both disabled and $T_7$ and $T_3$ are also disabled since there is no charge in capacitors $C_7$ and $C_3$.

For element 11, $T_6$ and $T_5$ are disabled but $T_7$ and $T_3$ are enabled due to their gate capacitance charges. Therefore, $Q_{11}$ is pulled down to ZERO level through $T_7$ and $T_3$, disabling $T_2$. Therefore, $Q_{11}$ rises to level ONE, enabling $T_1$ and maintaining $Q_{11}$ at level ZERO.

Now consider element 10 again. Input $I_{102}$ has swung to level ONE ($I_{102}$=$Q_{11}$), thus enabling $T_4$. Now $Q_{10}$ is pulled down through $T_4$ to level ZERO.

Considering element 12, $I_{121}$=$Q_{11}$=1 and $I_{122}$=$Q_{10}$=0. The charge in capacitor $C_7$ enables $T_7$ but no enabling charge is at the gate of $T_3$ and $T_3$ is therefore disabled. At $t_o$, $Q_{12}$ was ZERO and, thereore, since there is no current path established through $T_7$ and $T_3$ at time $t_1$, $Q_{12}$ remains at ONE and $Q_{12}$ at ZERO.

Thus the condition of the counter at time $t_1$ is as follows:

| $C_L$ | $I_{101}$ | $I_{102}$ | $Q_{10}$ | $I_{111}$ | $I_{112}$ | $Q_{11}$ | $I_{121}$ | $I_{122}$ | $Q_{12}$ |
|---|---|---|---|---|---|---|---|---|---|
| 0 | 0 | 1 | 0 | 0 | 0 | 1 | 1 | 0 | 0 |

At time $t_2$, $C_L$ swings to level ONE. Considering element 10, $T_5$ and $T_6$ are now enabled. Input $I_{101}$=0, therefore no charge is transferred to the gate of $T_3$. $Q_{10}$=0, therefore $T_1$ is disabled and charge is transferred to the gate of $T_7$ and stored in capacitor $C_7$.

Considering element 11, as both $T_6$ and $T_5$ are now enabled due to $C_L$, charge in capacitor $C_7$ is discharged through $T_1$ to reference ground potential ($Q_{11}$=1, therefore $T_1$ enabled) and charge in capacitor $C_3$ is discharged through $T_5$ to $I_{111}$ which is at level ZERO.

Considering element 12, as $I_{121}$=1 and $T_5$ is enabled, charge is transferred to the gate of $T_3$ and stored in $C_3$. Enabling charge at the gate of $T_7$ remains.

Thus, it will be seen that the conditions of the inputs and outputs of the elements 10, 11 and 12 remain the same at time $t_2$ as at time $t_1$ and that the only changes which have taken place are the charging or discharging (as the case may be) of the capacitors $C_7$ and $C_3$.

At time $t_3$, $C_L$ swings to ZERO. Considering element 10, the charge at the gate of $T_7$ enables $T_7$ but $T_3$ is disabled as $C_3$ was previously discharged. Therefore, Q remains at ONE and Q at ZERO.

Considering element 12, each of $T_7$ and $T_3$ has enabling charge at the gate thereof and $Q_{12}$ is pulleddown to ZERO as $C_L$=0. Therefore, Q rises to ONE.

Now, considering element 11, $I_{112}$=1. Therefore $T_4$ is enabled, pulling $Q_{11}$ down to level ZERO.

Thus the condition of the counter at time $t_3$ is as follows:

| $C_L$ | $I_{101}$ | $I_{102}$ | $Q_{10}$ | $I_{111}$ | $I_{112}$ | $Q_{11}$ | $I_{121}$ | $I_{122}$ | $Q_{12}$ |
|---|---|---|---|---|---|---|---|---|---|
| 0 | 1 | 0 | 0 | 0 | 1 | 0 | 0 | 0 | 1 |

At time $t_4$, $C_L$ swings to ONE. Considering element 10, $I_{101}$ is ONE and $T_5$ is enabled, and, therefore, charge is transferred to and stored in $C_3$. $Q_{10}$ is ONE, $T_1$ is discharged and $T_6$ is enabled. Therefore, charge is transferred to and stored in $C_7$.

Considering element 11, $Q_{11}$ is ONE, $T_1$ is disabled and $T_6$ is enabled. Therefore, charge is transferred to and stored at $C_7$. Since $I_{111}$ is ZERO, no change occurs at the gate of $T_3$.

Considering element 12, $Q_{12}$ is ONE and, therefore, $T_1$ is enabled. $T_6$ is also enabled, and $C_7$ is discharged. $I_{121}$ is ZERO and $T_5$ is enabled and, therefore $C_3$ is also discharged.

At time $t_5$, $C_L$ swings to ZERO. Considering element 10, $T_6$ and $T_5$ are both disabled and $Q_{10}$ is therefore pulled down through $T_7$ and $T_3$ to ZERO due to charge accumulated in $C_7$ and $C_3$, respectively, at time $t_4$. $Q_{10}$ therefore rises to ONE.

Considering element 12, $I_{122}$=$Q_{10}$=1. Therefore, $T_4$ is enabled and $Q_{12}$ is pulled down therethrough to ZERO.

Considering element 11, $I_{111}$=$Q_{10}$=1 and $I_{112}$=$Q_{12}$=0. $T_6$ and $T_5$ are disabled and only the gate of $T_7$ has enabling charge thereupon – $C_3$ being discharged. Therefore no change occurs in the level of $Q_{11}$, $T_2$ remains enabled and $Q_{11}$ remains at ZERO.

Thus the condition of the counter at time $t_5$ is as follows:

| $C_L$ | $I_{101}$ | $I_{102}$ | $Q_{10}$ | $I_{111}$ | $I_{112}$ | $Q_{11}$ | $I_{121}$ | $I_{122}$ | $Q_{12}$ |
|---|---|---|---|---|---|---|---|---|---|
| 0 | 0 | 0 | 1 | 1 | 0 | 0 | 0 | 1 | 0 |

Therefore, the counter has returned to the condition $Q_{10}$; $Q_{11}$: $Q_{12}$ = 1, 0, 0.

Figure 5:
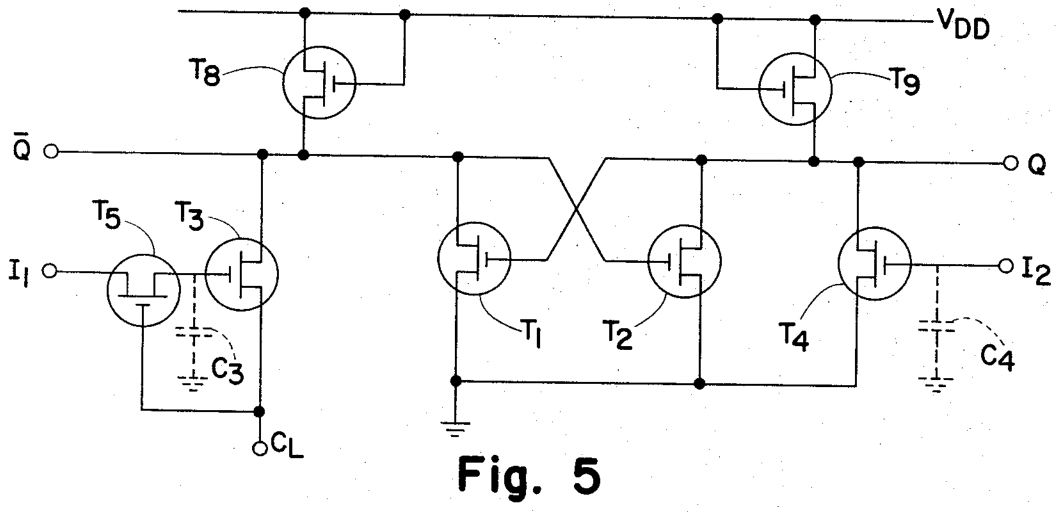
FIG. 5 is a circuit diagram of a ring-counter element for use in a ring-counter according to a further embodiment of the invention.

Since $T_7$ is always enabled when $T_3$ is enabled, the loop comprising transistors $T_6$ and $T_7$ is not essential to the operation of the element. Thus, the drain electrode of $T_3$ can be connected directly to Q, instead of through $T_7$, and $T_6$ and $T_7$ may be eliminated. This gives the circuit of FIG. 5. However it is desirable that $T_6$ and $T_7$ be present to increase the circuit reliability. Without $T_6$ and $T_7$ the ring-counter element is merely a clocked combinatorial circuit. With the inclusion of these transistors the network becomes a sequential circuit whose next state depends on its own present state as well as the input. Thus a ONE can be transferred if and only if the input is ONE and the present state is ZERO.

Figure 6:
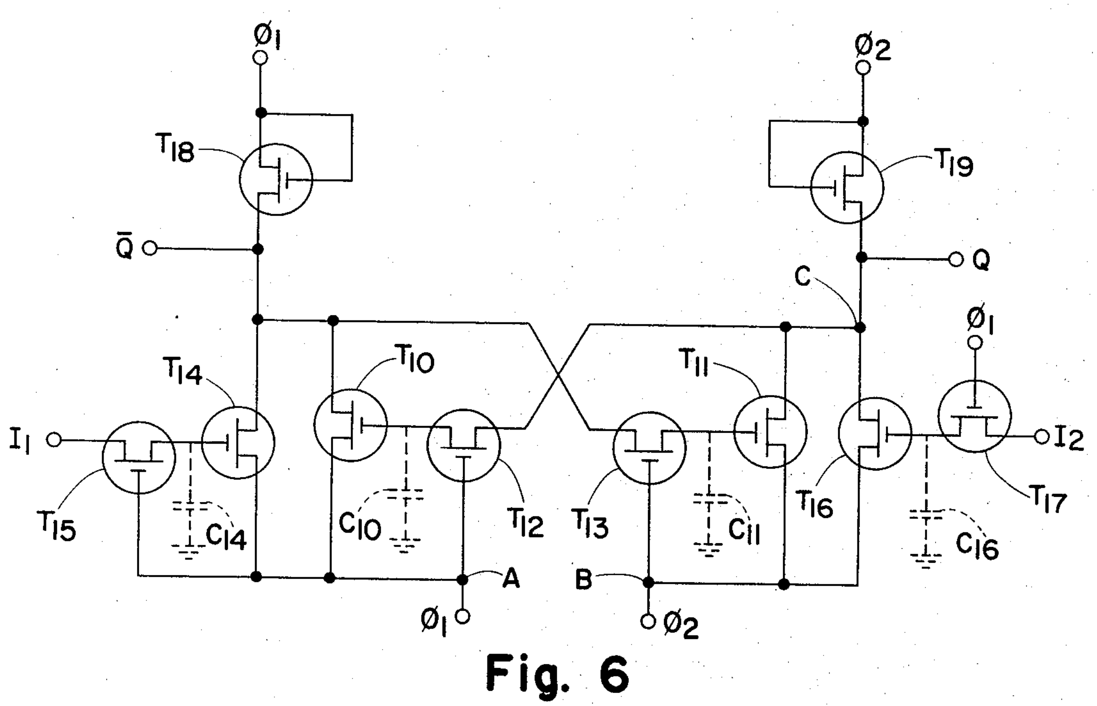
FIG. 6 is a circuit diagram of a ring-counter element for use in a ring-counter according to yet a further embodiment of the invention.

FIG. 6 shows a ring-counter element according to a further embodiment of the invention. The element comprises cross-coupled transistors $T_{10}$ and $T_{11}$, the gate-drain interconnects being effected through transistors $T_{12}$ and $T_{13}$. The source electrode of $T_{10}$ is connected to the gate electrode of $T_{12}$ and to a pulse-potential supply rail $\phi_1$. The source electrode of $T_{11}$ is connected to the gate electrode of $T_{13}$ and to a pulse-potential supply rail $\phi_2$. Transistor $T_{14}$ is connected in parallel with transistor $T_{10}$ and the gate electrode of $T_{14}$ is connected to an input $I_1$ through a transistor $T_{15}$. The gate electrode of $T_{15}$ is connected to the source electrode of $T_{14}$. The drain electrode of $T_{10}$ is also connected through load transistor $T_{18}$ to $\phi_1$, the drain and gate electrodes of $T_{18}$ being interconnected. A transistor $T_{16}$ is connected in parallel with transistor $T_{11}$ and the gate of $T_{16}$ is connected through a transistor $T_{17}$ to an input $I_2$. The gate of $T_{17}$ is connected to $\phi_1$. The drain electrode of $T_{11}$ is connected through load transistor $T_{19}$ to $\phi_2$, the gate and drain electrodes of $T_{19}$ being interconnected. An output Q is derived from the source electrode of $T_{19}$. The operation of this circuit will be described with reference to a complete ring-counter.

Figure 7:
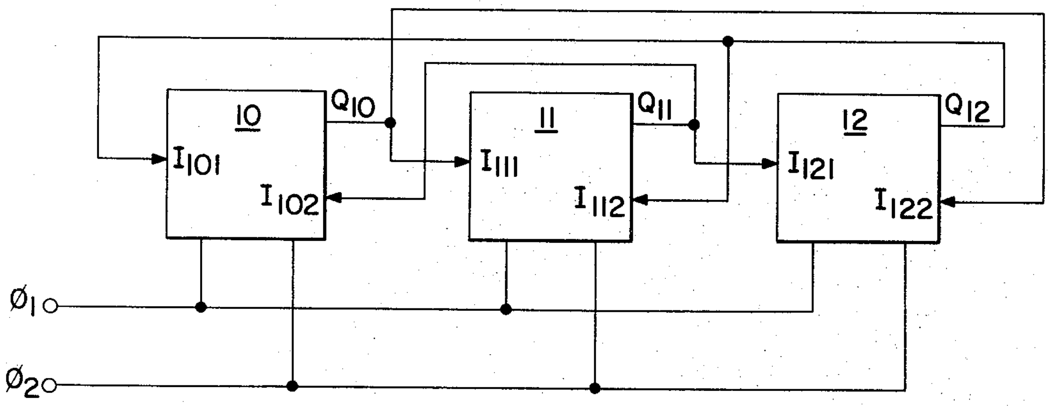
FIG. 7 is a block diagram of a three-element ring-counter utilizing the elements of FIG. 6.

A complete ring-counter containing three of the elements of FIG. 6 is shown in block form in FIG. 7. The counter again comprises elements 10, 11 and 12, each element having $I_1$ and $I_2$ inputs, designated $I_{101}$ and $I_{102}$, respectively for element 10; $I_{111}$ and $I_{112}$ for element 11; and $I_{121}$ and $I_{122}$ for element 12. The outputs Q are respectvely designated $Q_{10}$, $Q_{11}$ and $Q_{12}$. Additionally, each element has connections to the $\phi_1$ and $\phi_2$ rails in the manner of FIG. 6. Thus, as may clearly be seen, the block diagram of FIG. 7 is identical to that of FIG. 4 except for the substitution of $\phi_1$ and $\phi_2$ connections for the $C_L$ connections of FIG. 4.

Before describing the passage of data through the ring-counter, it will be helpful to establish a number of conditions for the circuit of FIG. 6;

A. When $\phi_1$ goes to ZERO, the capacitances $C_{10}$, $C_{14}$ and $C_{16}$ are isolated from any discharge or charge path since each of $T_{12}$, $T_{15}$ and $T_{17}$ is disabled. Therefore the state of each of $T_{10}$, $T_{14}$ and $T_{16}$ cannot change at least until $\phi_1$ returns to ONE.

B. When $\phi_2$ goes to ZERO, the capacitance $C_{11}$ is isolated from any discharge or charge path since $T_{13}$ is disabled. Therefore the state of $T_{11}$ cannot change until at least $\phi_2$ returns to ONE.

C. When $\phi_1$ goes to ONE, regardless of the state of $T_{10}$ or $T_{14}$, Q unconditionally goes to ONE.

D. When $\phi_2$ goes to ONE, regardless of the state of $T_{11}$ or $T_{16}$, Q unconditionally goes to ONE.

E. Since each of transistors $T_{15}$ and $T_{17}$ are controlled by $\phi_1$, the inputs $I_1$ and $I_2$ only affect the states of $T_{14}$ and $T_{16}$ respectively when $\phi_1$ is ONE.

F. When $\phi_1$ goes to ONE, the charge potential at the gate of $T_{10}$, stored in $C_{10}$, becomes the same as the output Q potential.

G. When $\phi_2$ goes to ONE, the charge potential at the gate of $T_{11}$, stored in $C_{11}$, becomes the same as Q potential.

H. Since the output Q from the circuit is unconditionally ONE when $\phi_2$ is ONE, Q is only valid when $\phi_2$ is ZERO.

Figure 8:
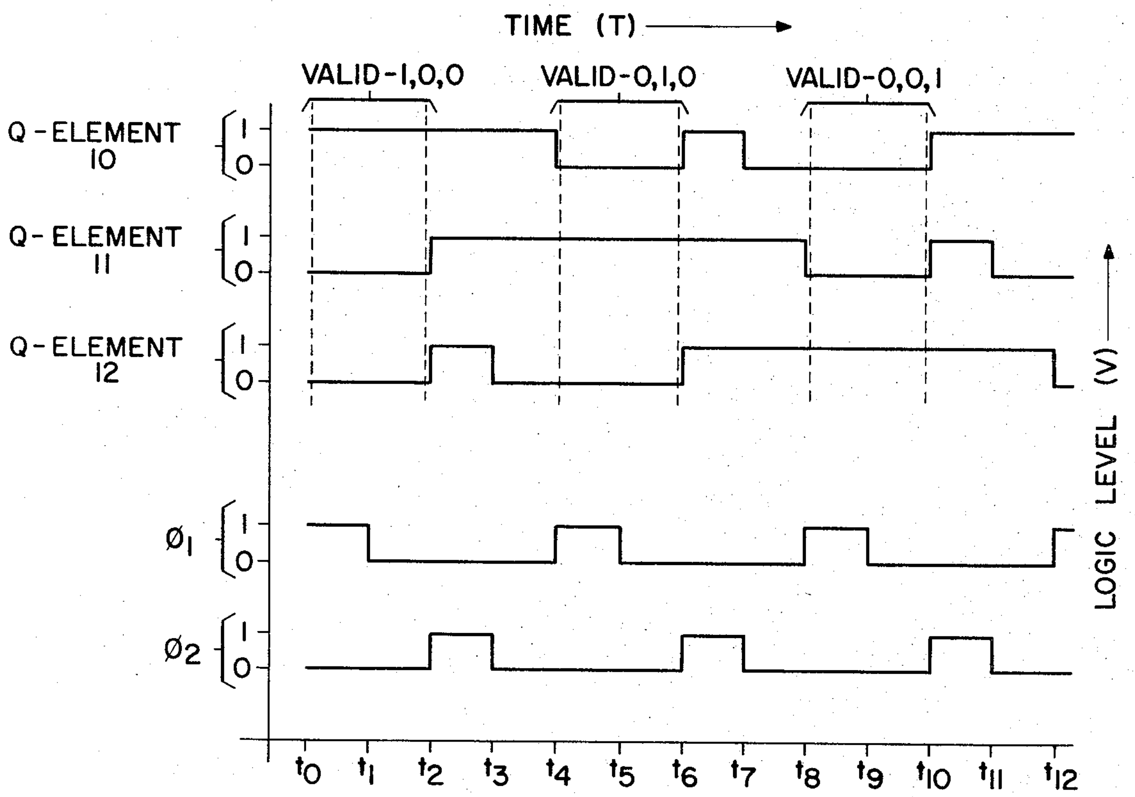
FIG. 8 is a graph of potential versus time in respect of pulse potentials applied to the element of FIG. 6.

Consider now passage of data through the ring-counter of FIG. 7. A plot of $\phi_1$ versus time and $\phi_2$ versus time is shown in the graph of FIG. 8, from which it may be seen that the $\phi_1$ and $\phi_2$ pulses are non-overlapping and that there are time periods between pulses during which $\phi_1$ and $\phi_2$ are both ZERO.

The variables which affect the output Q level from the circuit of FIG. 6 are the states of transistors $T_{10}$, $T_{11}$, $T_{14}$ and $T_{16}$ as reflected by the charge levels (ZERO or ONE) in their gate-to-substrate capacitances $C_{10}$, $C_{11}$, $C_{14}$ and $C_{16}$, respectively. The other factors are, of course, the conditions of $\phi_1$ and $\phi_2$. These factors are shown at various time intervals $t_o - t_{12}$ inclusive on the following chart, the condition of each element 10, 11 and 12 at each time interval being shown.

As shown, the counter commences in the condition 1, 0, 0 between times $t_o$ and $t_2$. The counter passes through the states 0, 1, 0 (times $t_4 - t_6$) and 0, 0, 1 (times $t_8 - t_{10}$) before returning to the state 1, 0, 0 at time $t_{12}$.

The mechanisms of the circuit elements 10, 11, 12 during state transition from 1, 0, 0 to 0, 1, 0 will be described, the remainder of the cycle being readily understood by reference to FIG. 6 and the following chart.

and $T_{16}$ must both be disabled, i.e., $C_{11}$ and $C_{16} = 0$. Since $I_{101} = Q_{12} = 0$, and $\phi_1 = 1$, $C_{14}$ must be ZERO. $Q_{10} = 1$ (condition C).

For element 11, $Q_{11} = 0$ and, therefore, $C_{10} = 0$ (condition F). $I_{112} = Q_{12} = 0$, and $\phi_1 = 1$. Therefore $C_{16}$ must be ZERO. Since $\phi_2 = 0$ and $Q_{11} = 0$, $T_{11}$ could be enabled or disabled, depending upon the previous state of $Q_{11}$. $I_{111} = Q_{10} = 1$, and, therefore, $C_{14} = 1$, since $\phi_1 = 1$. $Q_{11} = 1$ (condition C).

For element 12, $Q_{12} = 0$ and, therefore, $C_{10} = 0$ (condition F). Since $\phi_2 = 0$ and $Q_{12} = 0$, $T_{11}$ could be enabled or disabled, depending upon the previous state of $Q_{12}$. $I_{122} = Q_{10} = 1$ and $\phi_1 = 1$. Therefore $C_{16}$ must be ONE. $I_{121} = Q_{11} = 0$. Therefore, $C_{14}$ must be ZERO $\bar{Q}_{12} = 1$ (condition C).

At time $t_1$

For element 10, $\phi_1 \rightarrow 0$, and $T_{10}$ is enabled by $C_{10} = 1$. Therefore, $\bar{Q}_{10} \rightarrow 0$. Since $\phi_1$ and $\phi_2 = 0$, $C_{10}$, $C_{11}$, $C_{14}$ and $C_{16}$ remain at their previous states (conditions A and B). Since $T_{11}$ and $T_{16}$ remain disabled, $Q_{10}$ remains at ONE.

| Element | Time | $\phi_1$ | $\phi_2$ | Q | Q | $C_{10}$ | $C_{11}$ | $C_{14}$ | $C_{16}$ |
|---|---|---|---|---|---|---|---|---|---|
| 10 | | | | 1 | 1 | 1 | 0 | 0 | 0 |
| 11 | $t_o$ | 1 | 0 | 0 | 1 | 0 | — | 1 | 0 |
| 12 | | | | 0 | 1 | 0 | — | 0 | 1 |
| 10 | | | | 1 | 0 | 1 | 0 | 0 | 0 |
| 11 | $t_1$ | 0 | 0 | 0 | 0 | 0 | — | 1 | 0 |
| 12 | | | | 0 | 1 | 0 | — | 0 | 1 |
| 10 | | | | 1 | 0 | 1 | 0 | 0 | 0 |
| 11 | $t_2$ | 0 | 1 | 1 | 0 | 0 | 0 | 1 | 0 |
| 12 | | | | 1 | 1 | 0 | 1 | 0 | 1 |
| 10 | | | | 1 | 0 | 1 | 0 | 0 | 0 |
| 11 | $t_3$ | 0 | 0 | 1 | 0 | 0 | 0 | 1 | 0 |
| 12 | | | | 0 | 1 | 0 | 1 | 0 | 1 |
| 10 | | | | 0 | 1 | 0 | 0 | 0 | 1 |
| 11 | $t_4$ | 1 | 0 | 1 | 1 | 1 | 0 | 0 | 0 |
| 12 | | | | 0 | 1 | 0 | 1 | 1 | 0 |
| 10 | | | | 0 | 1 | 0 | 0 | 0 | 1 |
| 11 | $t_5$ | 0 | 0 | 1 | 0 | 1 | 0 | 0 | 0 |
| 12 | | | | 0 | 0 | 0 | 1 | 1 | 0 |
| 10 | | | | 1 | 1 | 0 | 1 | 0 | 1 |
| 11 | $t_6$ | 0 | 1 | 1 | 0 | 1 | 0 | 0 | 0 |
| 12 | | | | 1 | 0 | 0 | 0 | 1 | 0 |
| 10 | | | | 0 | 1 | 0 | 1 | 0 | 1 |
| 11 | $t_7$ | 0 | 0 | 1 | 0 | 1 | 0 | 0 | 0 |
| 12 | | | | 1 | 0 | 0 | 0 | 1 | 0 |
| 10 | | | | 0 | 1 | 0 | 1 | 1 | 0 |
| 11 | $t_8$ | 1 | 0 | 0 | 1 | 0 | 0 | 0 | 1 |
| 12 | | | | 1 | 1 | 1 | 0 | 0 | 0 |
| 10 | | | | 0 | 0 | 0 | 1 | 1 | 0 |
| 11 | $t_9$ | 0 | 0 | 0 | 1 | 0 | 0 | 0 | 1 |
| 12 | | | | 1 | 0 | 1 | 0 | 0 | 0 |
| 10 | | | | 1 | 0 | 0 | 0 | 1 | 0 |
| 11 | $t_{10}$ | 0 | 1 | 1 | 1 | 0 | 1 | 0 | 1 |
| 12 | | | | 1 | 0 | 1 | 0 | 0 | 0 |
| 10 | | | | 1 | 0 | 0 | 0 | 1 | 0 |
| 11 | $t_{11}$ | 0 | 0 | 0 | 1 | 0 | 1 | 0 | 1 |
| 12 | | | | 1 | 0 | 1 | 0 | 0 | 0 |
| 10 | | | | 1 | 1 | 1 | 0 | 0 | 0 |
| 11 | $t_{12}$ | 1 | 0 | 0 | 1 | 0 | 1 | 1 | 0 |
| 12 | | | | 0 | 1 | 0 | 0 | 0 | 1 |

Referring now to the above chart, to FIGS. 6 and 7, and to the conditions A to D, inclusive, set forth above, the elements 10, 11 and 12 function as follows.

Between times $t_o$ and $t_1$

For element 10, $Q_{10}=1$ and, therefore $C_{10}=1$ (condition F). Since $\phi_2=0$ and $Q_{10}=1$, if either of $T_{11}$ or $T_{16}$ were conducting, $Q_{10}$ would be ZERO. Therefore $T_{11}$ For element 11, $\phi_1 \rightarrow 0$, and $T_{14}$ is enabled by $C_{14} = 1$. Therefore $\bar{Q}_{11} \rightarrow 0$. $C_{10}$, $C_{11}$, $C_{14}$ and $C_{16}$ remain at their previous states, since $\phi_1$ and $\phi_2 = 0$ (conditions A and B). Regardless of whether $T_{11}$ is enabled or disabled, since $\phi_2 = 0$ and $Q_{11}$ was previously ZERO, $Q_{11}$ remains at ZERO.

For element 12, $\phi_1 \rightarrow 0$, and $T_{10}$ and $T_{14}$ are both disabled. Therefore $\overline{Q}_{12}$ remains at ONE. $C_{10}$, $C_{11}$, $C_{14}$ and $C_{16}$ remain at their previous states, since $\phi_1$ and $\phi_2 = 0$ (conditions A and B). Since $\phi_2 = 0$, $Q_{12}$ remains in its previous state of ZERO.

At time $t_2$

For each element, $\phi_2 \rightarrow 1$, therefore, $Q = 1$ (condition D). Also, since $\phi_1 = 0$, $C_{10}$, $C_{14}$ and $C_{16}$ do not change.

For element 10, $T_{10}$ remains enabled, therefore $\overline{Q}$ remains at ZERO. Thus, $C_{11}$ remains at ZERO (condition G).

For element 11, $T_{14}$ remains enabled, therefore $\overline{Q}$ remains at ZERO. Thus, $C_{11} = 0$ (condition G).

For element 12, $T_{10}$ and $T_{14}$ remain disabled, therefore $\overline{Q}$ remains at ONE. Thus, $C_{11} = 1$ (condition G).

At time $t_3$

For each element $\phi_2 \rightarrow 0$, therefore $C_{10}$, $C_{11}$, $C_{14}$ and $C_{16}$ retain their previous states (conditions A and B).

For element 10, $T_{11}$ and $T_{16}$ are both disabled, therefore $Q_{10}$ remains at ONE. Since $\phi_1 = 0$ and $Q_{10}$ was previously ZERO, $\overline{Q}$ remains at ZERO, regardless of $T_{10}$ and $T_{14}$.

For element 11, $T_{11}$ and $T_{16}$ are both disabled, therefore $Q_{11}$ remains at ONE. Since $\phi_1 = 0$ and $\overline{Q}$ was previously ZERO, $\overline{Q}$ remains at ZERO, regardless of $T_{10}$ and $T_{14}$.

For element 12, $T_{11}$ and $T_{16}$ are both enabled. Since $\phi_2 = 0$, $Q_{12} \rightarrow 0$. Since neither $T_{10}$ or $T_{14}$ is enabled, $\overline{Q}$ remains in its previous state, i.e., ONE.

At time $t_4$

For each element, $\phi_1 \rightarrow 1$, therefore $\overline{Q} = 1$ (condition C). Since $\phi_2 = 0$, $C_{11}$ retains its previous state.

For element 10, $I_{102} = Q_{11} = 1$. Therefore, $C_{16} \rightarrow 1$ and $T_{16}$ is enabled and, since $\phi_2 = 0$. $Q_{10} \rightarrow 0$ (condition F).

For element 11, $I_{112} = Q_{12} = 0$. Therefore $C_{16}$ remains at ZERO and $T_{16}$ is disabled. Since $T_{11}$ is disabled, $Q_{11}$ is isolated from $\phi_2 = 0$ and remains at ONE. Also $C_{10} = 1$ (condition F).

For element 12, $I_{122} = Q_{10} = 0$. Therefore $C_{16} \rightarrow 0$. However since $\phi_2 = 0$, $Q_{12}$ remains at ZERO regardless of the states of $T_{11}$ and $T_{16}$. Also $C_{10} = 0$ (condition F).

To determine $C_{14}$ for each element; for element 10, $I_{101} = Q_{12} = 0$, therefore $C_{14} = 0$. For element 11, $I_{111} = Q_{10} = 0$, therefore $C_{14} \rightarrow 0$. For element 12, $I_{121} = Q_{11} = 1$, therefore $C_{14} \rightarrow 1$.

At time $t_5$

For each element, $\phi_1 \rightarrow 0$ and $\phi_2$ remains at ZERO. Therefore, the capacitances $C_{10}$, $C_{14}$, $C_{16}$ and $C_{11}$ cannot charge (conditions A and B). Also, $I_1$ and $I_2$ for each element cannot affect the states of Q and $\overline{Q}$ (condition E).

For element 10, $Q = 0$ and, since $\phi_2$ is ZERO, Q remains at ZERO, regardless of the states of $T_{11}$ and $T_{16}$. $\overline{Q} = 1$ and $T_{10}$ and $T_{14}$ are both disabled. Therefore, Q remains at ONE.

For element 11, $Q = 1$ and, since $T_{11}$ and $T_{16}$ are both disabled, Q remains at ONE. $\overline{Q} = 1$, but, since $C_{10} = 1$, $T_{10}$ is enabled, and $Q \rightarrow 0$.

For element 12, $Q = 0$ and, since $\phi_2$ is ZERO, Q remains at ZERO, regardless of the states of $T_{11}$ and $T_{16}$. $\overline{Q} = 1$, but, since $C_{14} = 1$, $T_{14}$ is enabled, and $\overline{Q} \rightarrow \mathbf{0}$.

At time $t_6$

For each element, $\phi_2 \rightarrow 1$ and $\phi_1$ remains at ZERO. Therefore, the capacitances, $C_{10}$, $C_{14}$ and $C_{16}$ are isolated from any charge or discharge paths since $T_{12}$, $T_{15}$ and $T_{17}$ are disabled. Also, since $\phi_2$ is now ONE, Q must unconditionally be ONE.

For element 10, $T_{13}$ is enabled by $\phi_2 = 1$, and since $\overline{Q}$ is ONE, $C_{11} \rightarrow 1$. $T_{14}$ and $T_{10}$ are both disabled, therefore $\overline{Q}$ remains at ONE.

For element 11, $T_{13}$ is enabled and $C_{11}$ remains at ZERO, since $\overline{Q} = 0$. $\overline{Q}$ does not change.

For element 12, $\overline{Q}$ remains at ZERO and, since $T_{13}$ is enabled, $C_{11} \rightarrow 0$.

At time $t_7$

For each element, $\phi_1$ and $\phi_2$ are both ZERO, therefore the states of $T_{10}$, $T_{11}$, $T_{14}$ and $T_{16}$ remain unchanged.

For element 10, since $\phi_2 \rightarrow 0$ and $T_{11}$ and $T_{16}$ are enabled, $Q \rightarrow 0$. $\phi$ remains at ZERO, therefore $\overline{Q}$ remains at ZERO.

For element 11, $\overline{Q}$ remains at ZERO, since $\phi_1 = 0$. $T_{11}$ and $T_{16}$ are both disabled, therefore Q remains at ONE.

For element 12, $\overline{Q}$ remains at ZERO, since $\phi_1 = 0$. $T_{11}$ and $T_{16}$ are both disabled, therefore Q remains at ONE.

At time $t_8$

For each element, $\phi_2$ remains at ZERO, therefore $C_{11}$ remains unchanged. $\phi_1 \rightarrow 1$, therefore $\overline{Q} \rightarrow 1$.

For element 10, $\phi_2 = 0$, therefore Q remains at ZERO. Since $Q = 0$. $C_{10}$ remains at ZERO. $I_{101} = Q_{12} = 1$, therefore $C_{14}$ remains at ONE. $I_{102} = Q_{11} = 0$, therefore $C_{16} \rightarrow 0$.

For element 11, $I_{112} = Q_{12} = 1$, therefore $C_{16} \rightarrow 1$. $I_{111} = Q_{10} = \mathbf{0}$, therefore $C_{14}$ remains at ZERO. Since $T_{16}$ is enabled, $Q_{11} = \phi_2 = 0$. Therefore $Q_{11} \rightarrow \mathbf{0}$. Now, since $Q_{11} = \mathbf{0}$, and $\phi_1 = 1$, $C_{10} = Q_{11} = \mathbf{0}$. Therefore $C_{10} \rightarrow \mathbf{0}$.

For element 12, $I_{121} = Q_{11} = 0$, therefore $C_{14} \rightarrow 0$. $I_{122} = Q_{10} = \mathbf{0}$, therefore $C_{16}$ remains at ZERO.

At time $t_9$

For each element $\phi_1 \rightarrow {}_{0}$, $\phi_2$ remains at ZERO. Therefore, the states of $T_{10}$, $T_{11}$, $T_{14}$ and $T_{16}$ remain the same as at time $t_8$.

For element 10, since $\phi_2$ is ZERO, $Q_{10}$ remains at ZERO. Since $\phi_1 \rightarrow 0$ and $t_{14}$ is enabled, therefore $Q_{10} \rightarrow 0$.

For element 11, since $\phi_2$ is ZERO, $Q_{11}$ remains at ZERO. Since $t_{10}$ and $t_{14}$ are disabled, $\overline{Q}_{11}$ remains at ONE.

For element 12, since $t_{11}$ and $t_{16}$ are disabled, $Q_{12}$ remains at ONE. Since $t_{10}$ is enabled and $\phi_1 \rightarrow 1$, $\overline{Q}_{12} \rightarrow 1$.

At time $t_{10}$

For each element, $\phi_2 \rightarrow 1$ and $\phi_1$ stays at ZERO. Therefore Q is unconditionally ONE. Since $\phi_1 = \mathbf{0}$, $T_{10}$, $T_{14}$ and $T_{16}$ remain unchanged.

For element 10, since $\phi_1 = 0$, $\overline{Q}_{10}$ stays at ZERO. Since $T_{13}$ is enabled by $\phi_2 = 1$, $C_{11} \rightarrow \overline{Q}_{10} = 0$. Therefore $T_{11}$ is disabled.

For element 11, since $T_{10}$ and $T_{14}$ are both disabled, $\overline{Q}_{11}$ remains at ONE. Since $T_{13}$ is enabled by $\phi_2 = 1$, $C_{11} \rightarrow \overline{Q}_{11} = 1$. Therefore $T_{11}$ is enabled.

For element 12, since $\phi_1 = \mathbf{0}$, $\overline{Q}_{12}$ remains at ZERO. Since $T_{13}$ is enabled by $\phi_2 = 1$, $C_{11} \rightarrow \overline{Q}_{12} = 0$.

At time $t_{11}$

For each element, $\phi_2 \rightarrow 0$. $\phi_1$ remains at ZERO. Therefore, each of $C_{10}$, $C_{11}$, $C_{14}$ and $C_{16}$ is unchanged. For element 10, $T_{11}$ and $T_{16}$ are both disabled, therefore $Q_{10}$ remains at ONE. Since $\phi_1 = 0$, $\overline{Q}_{10}$ remains at ZERO.

For element 11, $T_{11}$ and $T_{16}$ are both enabled and $\phi_2 \rightarrow 0$. Therefore $Q_{11} \rightarrow 0$. Since $T_{14}$ and $T_{10}$ are disabled, $\overline{Q}_{11}$ remains at ONE.

For element 12, $T_{11}$ and $T_{16}$ are both disabled therefore $Q_{12}$ remains at ONE. Since $\phi_1 = 0$, $\overline{Q}_{12}$ remains at ZERO.

At time $t_{12}$

For each element, $\phi_1 \rightarrow 1$. $\phi_2$ remains at ZERO. Therefore, the state of $C_{11}$ remains unchanged. Also, $\overline{Q}$ is unconditionally ONE.

For element 11, $I_{111} = Q_{10} = 1$, therefore, $C_{14} \rightarrow 1$. $I_{112} = Q_{12} = 0$, therefore, $C_{16} \rightarrow 0$. $\phi_2 = 0$, therefore $Q_{11}$ remains at ZERO. Since $Q_{11} = 0$, $C_{10}$ remains at ZERO.

For element 12, $I_{121} = Q_{11} = 0$, therefore $C_{14}$ remains at ZERO. $I_{122} = Q_{10} = 1$, therefore $C_{16} \rightarrow 1$. Since $T_{16}$ is enabled $\phi_2 = Q_{12} \rightarrow 0$. Since $T_{12}$ is enabled by $\phi_1 = 1$, $Q_{12} = C_{10} \rightarrow 0$.

For element 10, $I_{101} = Q_{12} = 0$, therefore $C_{14} \rightarrow 0$. $I_{102} = Q_{11} = 0$, therefore $C_{16}$ remains at ZERO. $T_{11}$ remains disabled, therefore $Q_{10}$ remains at ONE. Since $\phi_1 = 1$, $T_{12}$ is enabled and $Q_{10} = C_{10} \rightarrow 1$.

Thus, at time $t_{12}$ the ring-counter has gone through a complete cycle; the condition thereof once again being 1, 0, 0.

The foregoing sequence of events is shown graphically in FIG. 8, which is a graph of time (T) versus logic level (V) in respect of times $t_0$ to $t_{12}$ inclusive and the logic levels of elements 10, 11, 12 and pulse trains $\phi_1$ and $\phi_2$, respectively. It may be readily seen from FIG. 8 that the counter state is valid from times $t_o - t_2$; $t_4 - t_6$; and $t_8 - t_{10}$. At time $t_{12}$, the sequence to events begins to repeat and, therefore, $t_{12}$ is analogous to $t_o$. It may be also be seen that the state goes valid when $\phi_1$ goes to level ONE and remains valid until $\phi_2$ goes to level ONE. When $\phi_2$ is ONE, the counter is going through a transition between valid states, during which period, the state of the counter is invalid. Thus, the counter may only be validly read when $\phi_1$ goes to level ONE and until $\phi_2$ goes to ONE.

Figure 9:
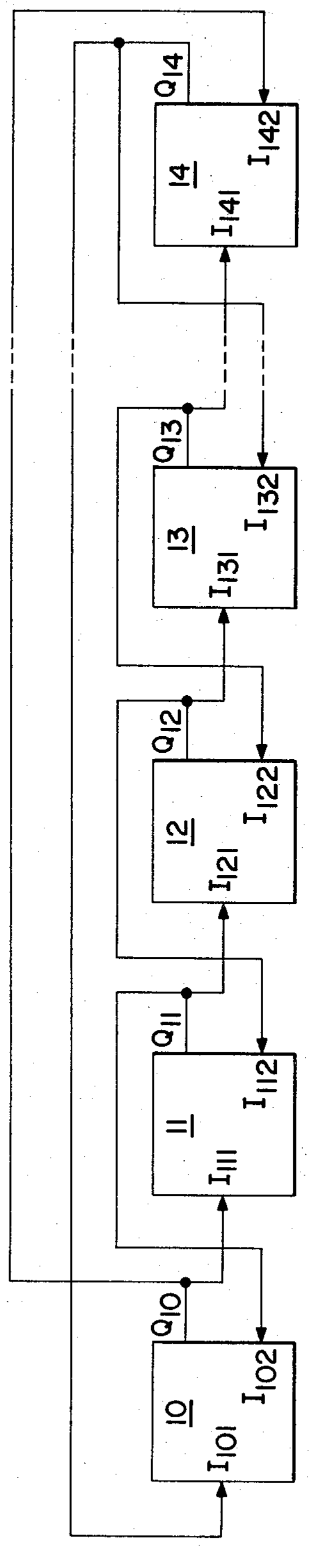
FIGS. 9 and 10 are block-diagrams of ring-counters according to further embodiments of the invention.

Turning now to FIG. 9, there is shown a complete ring-counter having at least five elements 10 to 14 inclusive. It has been stated herein that the unconditional validity of the ring-counter of the invention where each element has only one feedback path and one feedforward path is limited to blocks of three elements. This may be demonstrated by considering the ring-counter shown in FIG. 9 in conjunction with the circuit exemplified in FIG. 3.

Consider firstly FIGS. 3 and 4 together. Referring back to the description of FIG. 3, at time $t_o$;

$$C_L = 1$$
$$I_{101} = Q_{12} = I_{112} = 0$$
$$I_{102} = Q_{11} = I_{121} = 0$$
$$I_{111} = Q_{10} = I_{122} = 1$$

Now, suppose, for example, noise appears at the input $I_{121}$ such that $I_{121}$ 1.

For element 10, $I_{102}$ is now ONE and $T_4$ is therefore enabled. $Q_{10}$ is now discharged to ground through $T_4$ and $Q_{10} \rightarrow 0$. Also, the charge on $T_1$ is drained to ground and $T_1$ is disabled.

For element 11, $I_{121} = Q_{11}$ and, therefore, $Q_{11} \rightarrow 1$.

For element 12, $I_{121} = Q_{11} = 1$ and $I_{122} = Q_{10} = 0$. Since $C_L$ is ONE, $T_5$ and, hence, $T_3$ are enabled. Now, $C_7$ charges during the time period $t_o - t_1$. Therefore, at time $t_o$, $C_7$ is not yet charged, and $T_7$ is disabled, and charge therefore remains at the gate electrode of $T_2$, maintaining $T_2$ in its enabled state. Therefore, $Q_{12}$ is pulled down to reference ground potential through $T_2$, and goes to ZERO.

Thus, the state of the counter has gone from 1, 0, 0 to 0, 1, 0 when noise appears at the input $I_{121}$, at time $t_o$.

Suppose the noise appeared towards the end of the time period $t_o - t_1$. Now, $C_7$ of element 12 would be substantially fully charged and, since $T_3$ is enabled as explained above, the gate electrode of $T_2$ is discharged through $T_7$ and $T_3$. Thus, since $I_{122}$ 0, $Q_{12}$ goes to ONE. When $Q_{12} \rightarrow 1$, $I_{101}$ and $I_{112} \rightarrow 1$. When $I_{112}$ is ONE, $T_4$ of element 11 is enabled and $Q_{11}$ remains at ZERO. The noise appearing at $I_{121}$, such that $I_{121} \rightarrow 1$, also affects $I_{102}$, which also goes to ONE. Now, for element 10, $T_4$ is enabled and $Q_{10}$, therefore, goes to ZERO.

Thus the counter has gone directly from the state 1, 0, 0 to 0, 0, 1 — bypassing the 0, 1, 0 state.

In fact, if the circuit is examined in the condition where noise occurs at any one of the inputs at any given point in time during data transfer through the counter, it will be seen that the state of the counter always changes to another valid state.

Now, consider FIG. 3 in conjunction with the counter of FIG. 9, wherein like elements are referenced in like manner to FIG. 4.

Assuming there are only the five elements shown in the counter of FIG. 9, at time $t_o$, the counter state is 1, 0, 0, 0, 0. Therefore, considering element 12, $I_{122} = 0$ and $I_{121} = 0$ and $Q_{12} = 0$. Now, since $T_1$ is disabled and $T_6$ is enabled by $C_L = 1$, $C_7$ charges up to enable $T_7$ (see FIG. 3). Suppose noise now appears at $I_{121}$ which raises this input to level ONE. $T_5$ is enabled by $C_L = 1$ and passes the ONE level input at $I_{121}$ to the gate of $T_3$, which stores charge in $C_3$. At time $t_1$, $C_L \rightarrow 0$ and $T_3$ and $T_7$ are both enabled by charge at their gate capacitances. Therefore, any charge at the gate capacitance of $T_2$ is discharged to $C_L$ through $T_3$ and $T_2$ is disabled. Therefore, $Q_{12} \rightarrow 1$, since no change has occurred in element 13, and $I_{122}$ therefore remains at ZERO, maintaining $T_4$ in its disabled state. Therefore, we have an invalid state of the counter, since $Q_{10}$ remains at ONE, there being no feedback or feed-forward path associated therewith which is affected by the noise at $I_{121}$.

Upon analysis, it becomes clear that any given element only affects the preceding and succeeding elements by virtue of its feed-back and feed-forward paths. Thus, if that element is caused to change state by virtue of noise at one input thereto, the only other elements which are affected are the immediately adjacent elements. If the noise causes a ONE output from that element and a valid ONE output is already being derived from an element not adjacent thereto, then there will be two ONE outputs generated, giving an invalid condition.

Figure 10:
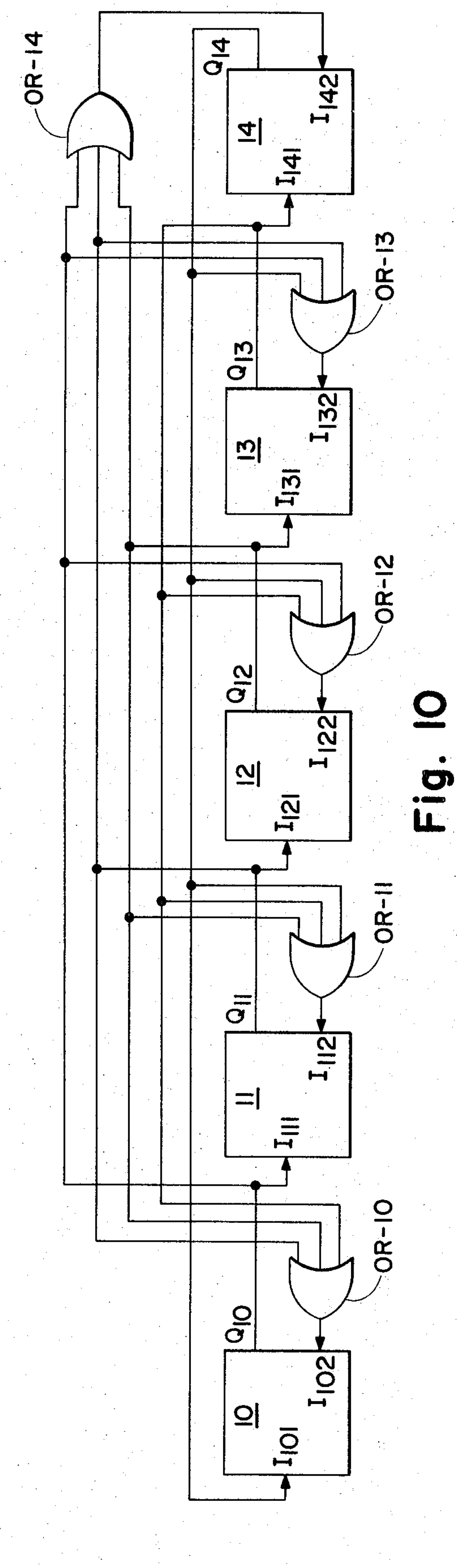

By consideration of the foregoing, it will now be realized that each element must affect <u>all</u> of the preceding and succeeding elements in the counter by means of feed-back and feed-forward paths, if a totally error-free system is to be realized This is shown in the ring-counter of FIG. 10, which is a five-element counter. The counter comprises elements 10 to 14 inclusive, each element having three feed-back and one feed-forward path connected to its output. The input and output to the elements are designated I and Q, respectively, in the same manner as in FIG. 9. It will be seen that by having a feed-back path to each of the other elements in the counter except one — which has a feed-forward path thereto — there are in the general case ($n$–2) feed-back paths associated with each element, wherein $n$ is the number of elements in the counter. Thus, there are ($n$–2) feed-back inputs associated with each element and, since noise on any input must affect the condition of the element with which it is associated — independently of the condition of the other inputs to that element — the feed-back inputs are fed to the element through an OR gate OR-10; OR-11 . . . OR-14. With this arrangement, it is apparent that noise occurring anywhere in the counter, which causes the condition of an element to change, will affect the remaining elements such that only one element will give a ONE output and the counter will therefore continue to assume a valid state.

Although the ring-counter of the invention has been exemplified with reference to specific embodiments thereof utilizing field-effect transistors, it will be apparent that the concept of the invention is equally valid when the ring-counter is composed of elements using bipolar techniques, providing such elements have inputs and outputs interconnected and functioning in the manner taught herein.

Various alternatives and modifications to the embodiments disclosed herein will be readily apparent to those skilled in the art without departing from the spirit and scope of the invention as described by the disclosure and defined by the claims appended hereto.

What is claimed is:

1. A ring-counter comprising a plurality of serially connected elements, each element having first and second data input terminal means and a data output terminal means, said data output terminal means of each element connected to one data input terminal means of the succeeding element to form a feed-forward path, and said output terminal means of each element further connected to the second data input terminal means of the preceding element to form a feed-back path; "$n$" said elements, "$n$" being an integer greater than 2, each one of said elements having a feed-back path extending from its data output terminal to the second data input terminal means upon each of $n-2$ consecutive elements immediately preceding said one element.

2. The ring counter of claim 1 wherein the second data input terminal means upon each of said elements is connected to said feedback paths through an OR-gate lens, the output of each of said OR-gate means being connected to said second data input terminal means, and the inputs to each of said OR-gate means being connected to each of said feedback paths which is to be connected to the respective one said terminal.

3. A ring-counter comprising a plurality of serially connected elements, each element having first and second data input terminal means and a data output terminal means, said data output terminal means of each element connected to one data input terminal means of the succeeding element to form a feed-forward path, and said output terminal means of each element further connected to the second data input terminal means of the preceding element to form a feed-back path, each said element having first and second cross-coupled field-effet effect transistors, the drain electrode of said first transistor connected to the gate electrode of said second transistor and the gate electrode of said first transistor connected to the drain electrode of said second transistor;

a fifth transistor, the gate electrode of which is connected to means for connection to a pulse potential supply means;

a third transistor having its source electrode connected to said means for connection to said pulse potential supply means and its gate electrode connected through said fifth transistor to first input terminal means;

the gate electrode of said third transistor connected through capacitance means to means for connection to a reference ground potential point;

the drain electrode of said first transistor connected through first load means to means for connection to a drain-potential supply rail and the drain electrode of said second transistor connected through second load means to means for connection to said drain-potential supply rail, the source electrodes of said first and second transistors connected to means for connection to a reference ground potential point;

a fourth transistor connected in parallel with said second transistor across the source and drain electrodes thereof, said fourth transistor having its gate electrode connected to second input terminal means and capacitance means connected between the gate electrode of said fourth transistor and means for connection to a reference ground potential point;

the drain electrode of said first transistor connected to the drain electrode of said third transistor and the drain electrode of said second transistor connected to output terminal means;

said output terminal means of each said element being connected to said second input terminal means of the preceding said element in said ring-counter and also connected to said first input terminal means of the succeeding said element in said ring-counter.

4. The ring-counter of claim 3 wherein said ring-counter contains "$n$" said elements — "$n$" being an integer greater than 2 — said output terminal means of each one of said elements being connected to said second input terminal means of each of the ($n$–2) consecutive elements immediately preceding said one element.

5. The ring counter of claim 4 wherein said first and second load means comprise eighth and ninth field-effect load transistors, respectively.

6. The ring-counter of claim 4 in integrated circuit form wherein said capacitance means comprise the gate to substrate capacitances of said third and fourth transistors.

7. The ring-counter of claim 4 wherein said capacitance means comprise the gate to substrate capacitances of said third and fourth transistors and each of said first and second load means comprises a field-effect load transistor.

8. The ring-counter of claim 3 wherein said first and second load means comprise eighth and ninth field-effect load transistors, respectively.

9. The ring-counter of claim 3 in integrated circuit form wherein said capacitance means comprise the gate to substrate capacitances of said third and fourth transistors.

10. The ring-counter of claim 3 wherein said capacitance means comprise the gate to substrate capacitances of said third and fourth transistors and each of said first and second load means comprises a field-effect load transistor.

11. A ring-counter comprising a plurality of serially connected elements, each element having first and second data input terminal means and a data output terminal means, said data output terminal means of each element connected to one data input terminal means of the succeeding element to form a feed-forward path, and said output terminal means of each element further connected to the second data input terminal means of the preceding element to form a feed-back path, each said element having first and second cross-coupled field-effect transistors, the drain electrode of said first transistor connected to the gate electrode of said second transistor and the gate electrode of said first transistor connected to the drain electrode of said second transistor;

fifth and sixth transistors, the gate electrodes of which are connected to means for connection to a pulse potential supply means;

a third transistor having its source electrode connected to said means for connection to said pulse potential supply means, its drain electrode connected to the source electrode of a seventh transistor and its gate electrode connected through said fifth transistor to first input terminal means;

the gate electrode of said third transistor connected through capacitance means to means for connection to a reference ground potential point;

the drain electrode of said first transistor connected through first load means to means for connection to a drain-potential supply rail and the drain electrode of said second transistor connected through second load means to means for connection to said drain-potential supply rail the source electrodes of said first and second transistors connected to means for connection to a reference ground potential point;

a fourth transistor connected in parallel with said second transistor across the source and drain electrodes thereof, said fourth transistor having its gate electrode connected to second input terminal means and capacitance means connected between the gate electrode of said fourth transistor and means for connection to a reference ground potential point;

the drain electrode of said first transistor connected to the drain electrode of said seventh transistor and the drain electrode of said second transistor connected to output terminal means.

12. The ring-counter of claim 11 wherein said ring-counter contains "*n*" said elements — "*n*" being an integer greater than 2 — said output terminal means of each one of said elements being connected via feed-back paths to said second input terminal means of each of the ($n$—2) consecutive elements immediately preceding said one element.

13. The ring-counter of claim 12 wherein said first and second load means comprise eighth and ninth field-effect load transistors, respectively.

14. The ring-counter of claim 12 in integrated circuit form wherein said capacitance means comprise the gate to substrate capacitances of said third, fourth and seventh transistors.

15. The ring-counter of claim 12 wherein said capacitance means comprise the gate to substrate capacitances of said third, fourth and seventh transistors and each of said first and second load means comprises a field-effect load transistor.

16. The ring-counter of claim 11 wherein said first and second load means comprise eighth and ninth field-effect load transistors, respectively.

17. The ring-counter of claim 11 in integrated circuit form wherein said capacitance means comprise the gate to substrate capacitances of said third, fourth and seventh transistors.

18. The ring-counter of claim 11 wherein said capacitance means comprise the gate to substrate capacitances of said third, fourth and seventh transistors and each of said first and second load means comprises a field-effect load transistor.

19. The ring-counter of claim 11 wherein the input terminal means upon each said element for receiving a plurality of feed-back paths as aforesaid is connected to said feed-back paths through an OR-gate means, the output of said OR-gate means connected to said input terminal means and the inputs to said OR-gate means connected to said feed-back paths.

20. A ring-counter comprising a plurality of serially connected elements, each element having first and second data input terminal means and a data output terminal means, said data output terminal means of each element connected to one data input terminal means of the succeeding element to form a feed-forward path and said output terminal means of each element further connected to the second data input terminal means of the preceding element to form a feed-back path, each said element having tenth and eleventh cross-coupled field-effect transistors, the drain electrode of said tenth transistor connected through a thirteenth transistor to the gate electrode of said eleventh transistor, and the drain electrode of said eleventh transistor connected through a twelfth transistor to the gate electrode of said tenth transistor;

the gate electrode of said twelfth transistor connected to the source electrode of said tenth transistor and to means for connection to a first pulse-potential supply means;

the gate electrode of said thirteenth transistor connected to the source electrode of said eleventh transistor and to means for connection to a second pulse-potential supply means;

said first and second pulse-potential supply means giving first and second non-overlapping pulse trains, respectively, swinging between enabling pulses for the transistors in said element to which they are applied and disabling pulses therefor, these being periods of time between consecutive first and second and second and first pulses during which both said pulse-potential supply means give disabling potentials;

a fourteenth transistor in parallel with said tenth transistor and connected across the drain and source electrodes thereof, said drain electrodes of said tenth and fourteenth transistors being interconnected and connected through first load means to means for connection to said first pulse-potential supply means;

a sixteenth transistor in parallel with said eleventh transistor and connected across the drain and source electrodes thereof, said drain electrodes of said eleventh and sixteenth transistors being interconnected and connected through a second load means to means for connection to said second pulse-potential supply means;

first and second input terminal means, said first input terminal means connected to the gate electrode of said fourteenth transistor through a fifteenth transistor and said second input terminal means connected to the gate electrode of said sixteenth transistor through a seventeenth transistor;

the gate electrode of said fifteenth transistor connected to means for connection to said first pulse-potential supply means and the gate electrode of said seventeenth transistor connected to means for connection to said first pulse-potential supply means;

capacitance means respectively connected between the gate electrodes of said tenth, eleventh, fourteenth and sixteenth transistors and means for connection to a reference ground potential point;

output terminal means connected to the drain electrode of said sixteenth transistor;

said output terminal means of each said element being connected to said second input terminal means of the preceding said element in said ring-counter and also connected to said first input terminal means of the succeeding said element in said ring-counter.

21. The ring-counter of claim 20 wherein said ring-counter contains "*n*" said elements — "*n*" being an integer greater than 2 — said output terminal means of each one of said elements being connected to said second input terminal means of each of the ($n$—2) consecutive elements immediately preceding said one element.

22. The ring-counter of claim 21 wherein said first and second load means comprise eighteenth and nineteenth field-effect load transistors, respectively.

23. The ring-counter of claim 21 in integrated circuit form wherein said capacitance means respectively comprise the gate to substrate capacitances of said tenth, eleventh, fourteenth and sixteenth transistors.

24. The ring-counter of claim 20 in integrated circuit form wherein said capacitance means respectively comprise the gate to substrate capacitances of said tenth, eleventh, fourteenth and sixteenth transistors and said first and second load means comprise eighteenth and nineteenth field-effect load transistors, respectively.

25. The ring-counter of claim 21 wherein the input terminal means upon each said element for receiving a plurality of feed-back paths as aforesaid is connected to said feed-back paths as aforesaid is connected to said feed-back paths through an OR-gate means, the output of said OR-gate means connected to said input terminal means and the inputs to said OR-gate means connected to said feed-back paths.

26. The ring-counter of claim 20 wherein said first and second load means comprise eighteenth and nineteenth field-effect load transistors, respectively.

27. The ring-counter of claim 20 in integrated circuit form wherein said capacitance means respectively comprise the gate to substrate capacitances of said tenth, eleventh, fourteenth and sixteenth transistors.

28. The ring-counter of claim 20 in integrated circuit form wherein said capacitance means respectively comprise the gate to substrate capacitances of said tenth, eleventh, fourteenth and sixteenth transistors of said first and second load means comprise eighteenth and nineteenth field-effect load transistors, respectively.

* * * * *